United States Patent [19]

Slack

[11] 4,214,653

[45] Jul. 29, 1980

[54] FRICTION CLUTCHES

[75] Inventor: Howard Slack, Sheffield, England

[73] Assignee: GKN Transmissions Ltd., Birmingham, England

[21] Appl. No.: 955,122

[22] Filed: Oct. 25, 1978

[30] Foreign Application Priority Data

Nov. 1, 1977 [GB] United Kingdom ............... 45353/77

[51] Int. Cl.$^2$ ..................... F16D 13/56; F16D 21/06
[52] U.S. Cl. .................... 192/48.7; 192/48.8; 192/70.21; 192/89 B
[58] Field of Search .................. 192/48.7, 48.8, 70.21, 192/70.27, 89 B, 70.28

[56] References Cited

U.S. PATENT DOCUMENTS

| 2,600,520 | 6/1952 | Spase | 192/70.21 |
| 2,899,897 | 8/1959 | Ludwig | 192/48.7 |
| 3,021,931 | 2/1962 | Holz | 192/48.7 |
| 3,215,233 | 11/1965 | Smith et al. | 192/48.7 |
| 3,279,572 | 10/1966 | Dearnley | 192/48.7 |

FOREIGN PATENT DOCUMENTS 1431268  4/1976  United Kingdom ................... 192/48.7

Primary Examiner—Rodney H. Bonck
Attorney, Agent, or Firm—Merriam, Marshall & Bicknell

[57] ABSTRACT

A dual clutch has the usual driving member, two pressure plates and two driven plates frictionally engaged between a pressure plate and the driving member. The clutch also has a conventional cover member. The spring arrangement for providing a clamp load on the driven members between the driving members and the pressure plates is made up of two separate springs. One spring is a diaphragm spring, complete with inwardly extending release fingers, which act between the cover member and the main or first pressure plate. The second spring is a belleville spring which is less strong than the first mentioned spring, and acts between the two pressure plates to provide the clamp load for the second pressure plate but reduce the clamp load for the main pressure plate.

4 Claims, 4 Drawing Figures

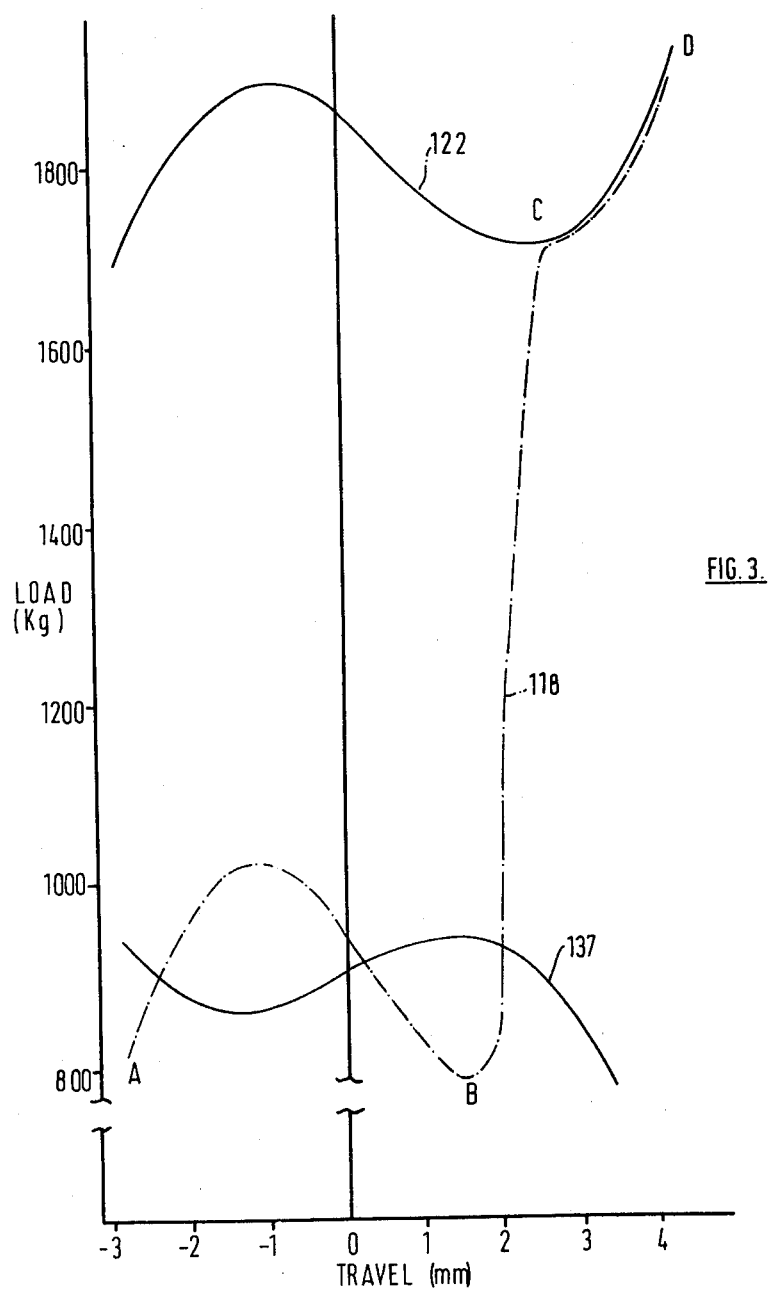

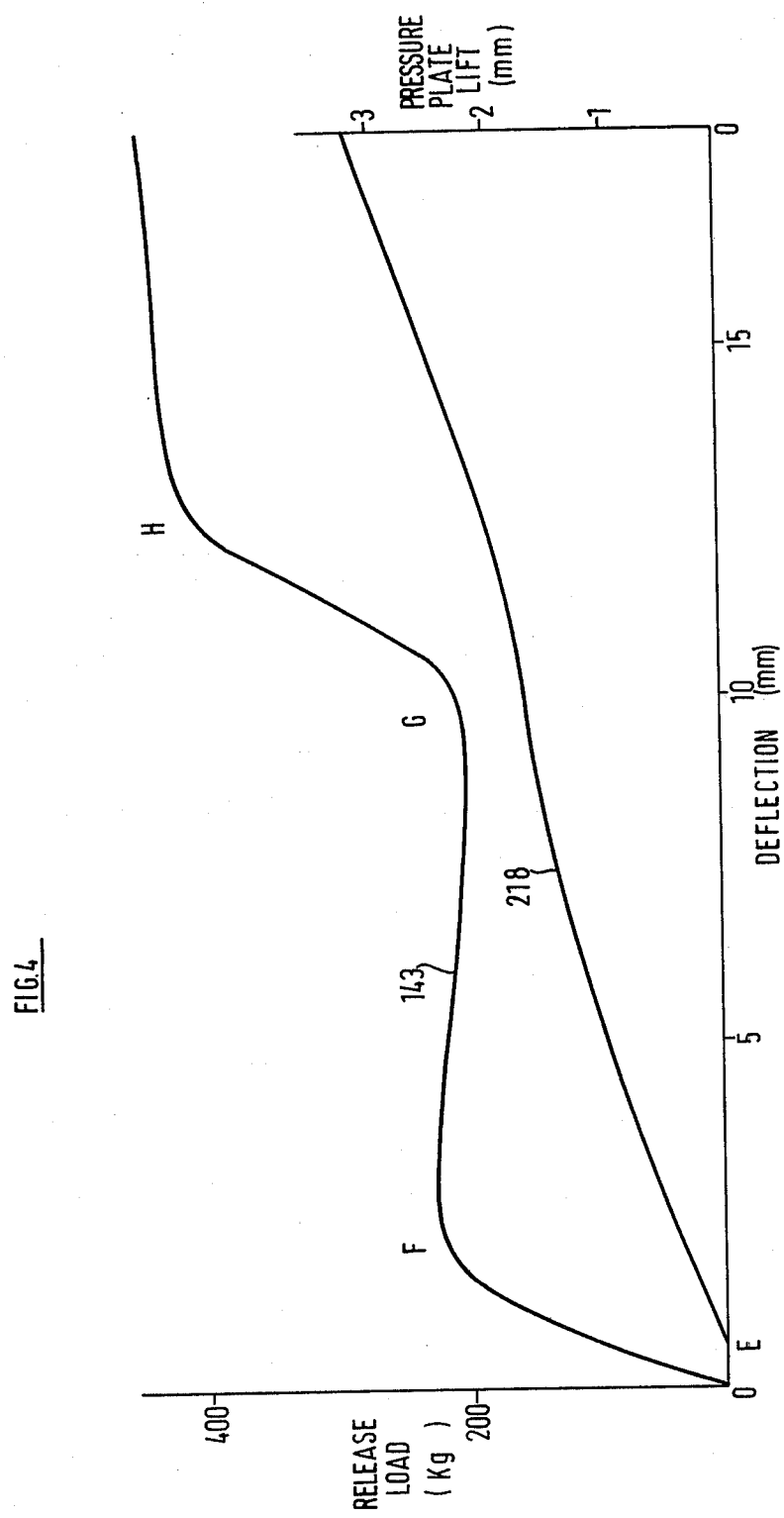

FRICTION CLUTCHES

BACKGROUND OF THE INVENTION

The invention relates to friction clutches and in particular to dual friction clutches.

A dual friction clutch, which is employed for connecting a driving member to either one or both of two driven members or of disconnecting both driven members from the driving member is typically used in an agricultural tractor or in other situations where a main vehicle drive and a power take off (PTO) are required from the main engine. A typical dual clutch incorporates a single release mechanism and is such that when the release mechanism is fully released a driving connection is established from the driving member to both driven members. As the release mechanism is operated, first the driven member associated with the main vehicle drive is released and subsequently the driven member associated with the power take off is released.

A typical dual clutch incorporates two independent pressure plates which engage driven members against friction faces of the driving member and employ two independent springs or sets of springs to act between the clutch cover and the associated pressure plate to provide clamping loads on the driven members. Dual clutches of this kind tend to occupy a large space in a situation where a vehicle designer would like to be able to reduce the space required. Another disadvantage of a conventional dual clutch is that the release load required on a driver operated foot pedal tends to be excessive if the release travel is maintained within reasonable limits.

An object of the invention is to provide an improved dual clutch which can be made compact and can be made to avoid excessive release travel.

SUMMARY OF THE INVENTION

According to the present invention there is provided a dual friction clutch comprising a driving member; a first driving friction face on the driving member; a first driven member having two friction faces, one for engagement with the first driving face; a first pressure plate arranged to engage the second friction face of the first driven member; a second driving friction face on the driving member; a second driven member having two friction faces, one for engagement with the second driving face; a second pressure plate arranged to engage the second friction face of the second driven member; a cover member secured to the driving member; a first plate spring interposed between the cover member and the first pressure plate to urge the first driven member into frictional engagement with the first driving face; a second plate spring interposed between the first pressure plate and the second pressure plate to urge the second pressure plate into frictional engagement with the second driving face, the second plate spring exerting a lower force than the first plate spring so as only partially to counteract the force of the first spring on the first pressure plate; and release means operatively connected to retract the first pressure plate on initial release movement thereof and for also retracting the second pressure plate on further release movement thereof. The layout of such a clutch can be made particularly compact. The relationships between the characteristics of the two plate springs can be made such that excessive release loads are avoided as will be explained subsequently.

Preferably the first plate spring is a diaphragm spring having an annular spring portion and integral release levers, the release levers constituting the release means. This provides a particularly simple construction and as a high rate diaphragm spring is required to provide sufficient clamping load for the first driven member even when opposed by the force on the second plate spring, the fingers of the diaphragm spring are relatively thick and rigid which tends to reduce bending of the fingers.

The second plate spring may be a belleville spring because there is no requirement to relieve the clamp load of this spring directly.

Preferably a stop member is provided on the first pressure plate and is arranged to engage with a second stop member on the second pressure plate during release of the clutch such that after initial release movement both pressure plates are retracted together. This ensures positive release of the second driven member and ensures that during the latter part of the release movement the release load is generated solely by the first plate spring.

BRIEF DESCRIPTION OF THE DRAWINGS

An embodiment of the invention will now be described by way of example only with reference to the accompanying drawings in which:

FIGS. 3 and 4 are graphs showing characteristics of the clutch.

DESCRIPTION OF THE PREFERRED EMBODIMENTS

Figure 1:
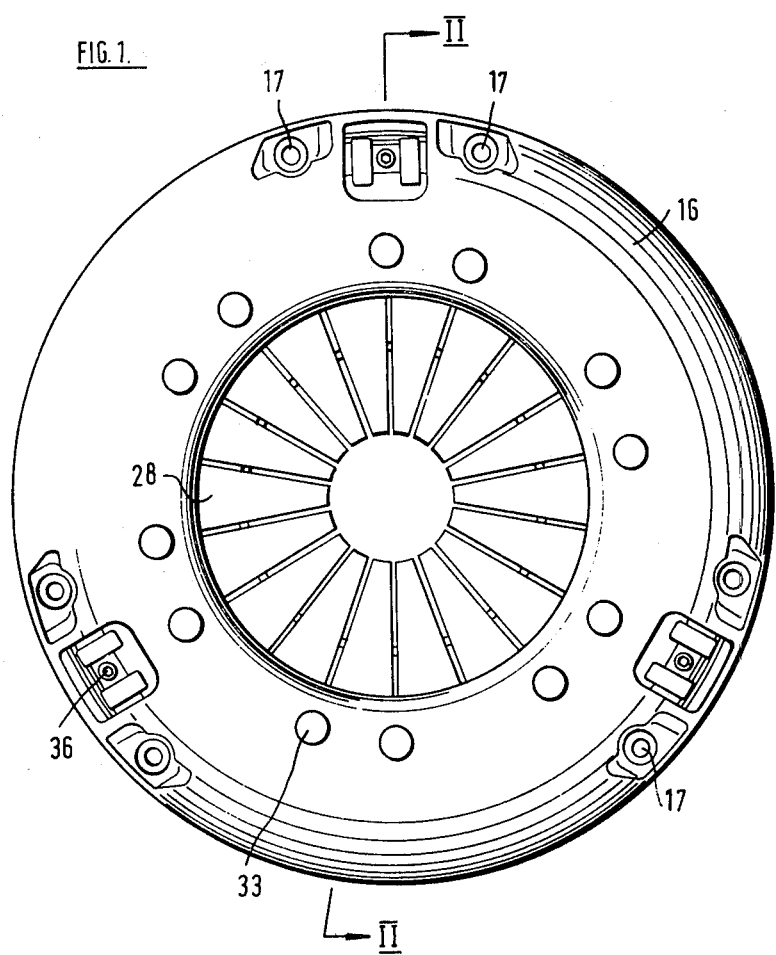
FIG. 1 is an end view of a clutch according to the invention
Figure 2:
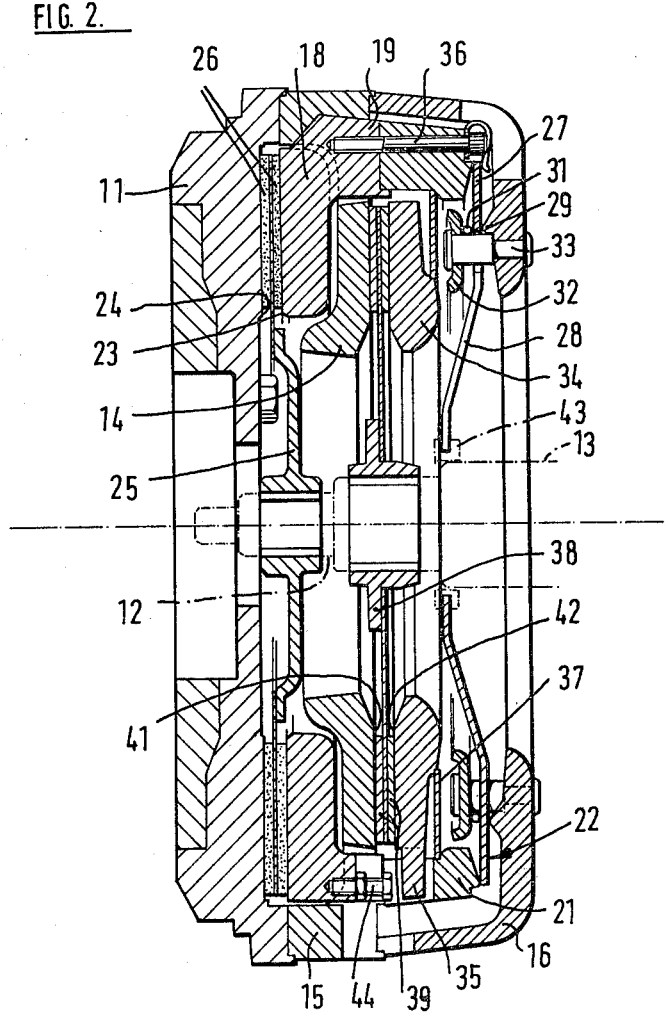
FIG. 2 is a section on line II—II of FIG. 1.

The clutch shown in FIGS. 1 and 2 is secured to a fly-wheel 11 which is connected to the output shaft (not shown) of an internal combustion engine and which acts as a driving member. The clutch is intended for selectively connecting the fly-wheel 11 to two concentric output shafts 12 and 13. Output shaft 12 is intended for the main drive of a vehicle and is in practice connected to the input of a gearbox (not shown). Output shaft 13 is intended for connection to a power take off (PTO) drive (not shown) which may for example be used in an agricultural tractor for driving an agricultural implement.

The clutch incorporates two major components which are secured directly and rigidly to the fly-wheel 11. The first of these components is a driving plate 14 which is primarily arranged in the interior of the clutch but extends outwardly to a rim 15 which is secured to the rim of the fly-wheel 11. The second of these components is an annular clutch cover 16. The driving plate 14 and cover 16 are secured to the fly-wheel 11 by means of a series of bolts 17, shown clearly in FIG. 1.

The first, or main, portion of the clutch incorporates a first pressure plate 18 which is arranged between the fly-wheel 11 and the driving plate 14 and is connected for rotation with the fly-wheel by means of lugs 19 which extend through and are engaged by apertures in the driving plate 14. The lugs carry an annular castellated extension 21 which extends to and is engaged by a diaphragm spring 22 which will be described in more detail subsequently. Pressure plate 18 incorporates a driving face 23 which is arranged to face a similar driving face 24 on the fly-wheel 11. A first driven member 25 which is in the form of a conventional clutch driven plate has annular friction facings 26 interposed between the driving faces 23 and 24 and these friction facings have two friction faces which respectively engage with the driving faces 23 and 24.

The diaphragm spring 22 is of conventional construction and incorporates an annular plate spring 27 and a series of inwardly extending fingers 28. A first circular fulcrum for the diaphragm spring is provided by an annular ridge 29 which projects inwardly from the inner face of the cover 16. A round wire fulcrum ring 31 is arranged on the opposite side of the diaphragm spring 22 from the annular ridge 29 and this fulcrum ring 31 is supported by an annular pressing 32 which is in turn secured to the cover 16 by means of shouldered rivets 33. The diaphragm spring is arranged so that in the absence of any load applied to the fingers from outside the clutch it urges the first pressure plate 18 towards the fly-wheel 11 and thus provides a clamping load on the driven plate 25. The driven plate 25 is splined to the output shaft 12 so that a driving connection is established between the fly-wheel and this output shaft.

A second annular pressure plate 34 is arranged between the driving plate 14 and the cover 16. It is located with respect to the first pressure plate 18 for rotation therewith by means of three drive lugs 35 which are arranged in castellations of the extension 21. For assembly purposes the castellated extension 21 is a separate casting from the main part of pressure plate 18 and is secured thereto by a series of bolts 36. A plate spring 37 in the form of a simple belleville spring is arranged between the second pressure plate 34 and the extension 21 of the first pressure plate 18 in such a manner that it tends to urge the pressure plate 34 towards the driving plate 14. This spring 37 is located in annular spigots in the two pressure plates so that it also tends to assist lugs 35 in locating the pressure plate 34. A second driven member 38, also in the form of a conventional clutch driven plate has friction facings 39 arranged between driving faces 41 and 42 of the driving plate and pressure plate respectively. In the situation as shown the belleville spring 37 provides a clamping load on the driven plate 38 between driving plate 14 and pressure plate 34 so that a driving connection is established from the fly-wheel 11 to the driven plate 38. The driven plate 38 is splined to the PTO shaft 13 so that the driving connection extends to this shaft.

In order to release the clutch the inner ends of the fingers 28 are deflected towards the interior of the clutch by means of a release ring 43 shown in chain dotted outline. Initial movement of the release ring tends to pivot the outer plate spring portion about the circular fulcrum provided between annular ridge 29 and fulcrum ring 31. This deflection initially decreases the clamp load between pressure plate 18 and fly-wheel 11 and so gradually releases the drive to driven plate 25. Further movement of the release ring 43 completely frees the driven plate 25 and begins to lift the pressure plate 18 away from the fly-wheel 11. This release movement allows partial relaxation of the belleville spring 37, thereby reducing the clamp load of driving plate 14 and pressure plate 34 on the driven plate 38. Further release movement causes engagement between a series of adjustable stops 44 on the pressure plate 18 and lugs 35 of the pressure plate 34. Still further release movement then raises the two pressure plates 34 and 18 together whilst maintaining the configuration and loading on the belleville spring 37. As the release ring 43 is allowed to retract the clutch gradually engages in the opposite sequence.

Thus with this dual clutch it is possible to partially operate the release ring so that the main drive to shaft 12 is released, while the PTO drive is maintained. Further operation of the release mechanism also releases the PTO drive. Both the PTO drive and the main drive can be re-engaged in a controllable manner by gradual controlled retraction of the release ring.

In order to achieve particularly desirable characteristics for the clutch careful selection of the characteristics of the diaphragm spring 27 and belleville spring 37 are necessary. A primary requirement is that the diaphragm spring 27 should be much stronger than the belleville spring 37 because the clamp load on the first driven plate 25 is equal to the difference in the two spring loads. For this reason the diaphragm spring 27 is a stronger spring than would normally be employed in a conventional clutch of equivalent torque capacity.

Further details of the characteristics of the individual springs and of the clutch as a whole will now be described with reference to FIGS. 3 and 4.

FIG. 3 shows that clamp load characteristic of the pressure plate 18 acting on the driven plate 25. As briefly explained previously, the clamp load is produced by the difference in the forces of the two springs 22 and 37. In FIG. 3, the load characteristic of spring 22, with no release load applied to the fingers, is shown as curve 122. The zero travel position represents the nominal design position with an unworn driven plate. Outside the range of travel shown in a negative direction, the spring load reduces to zero when the spring becomes completely relaxed. Curve 137 is a corresponding curve for the characteristic of the spring 37. This curve is drawn as a mirror image of the conventional belleville spring curve because spring 37 acts in opposition to spring 22 and is such that it becomes relaxed as the travel increases in a positive direction beyond the range shown.

Curve 118 shows the nett load applied to the pressure plate 18, with no release load but with the pressure plate 18 in a range of positions from the nominal position as shown. Travel in a negative direction occurs for example as the driven plate 25 wears and notional travel in a positive direction could occur for example if tolerance build up in the clutch alters the effective clamping position. In the range between point A and point B curve 118 represents the difference between the value of curve 112 and the value of curve 137. This is the range over which the two springs 22 and 37 act in opposition. At point B stop 44 engages lug 35 so that further movement of pressure plate 18 also involves lifting of pressure plate 34. This requires a sudden increase in load to produce any further deflection and the curve between points B and C would be vertical but for flexibility in the system. At point C pressure plate 34 has been lifted clear of driven plate 38 and stop 44 is fully in engagement with lug 35 so that both pressure plates move together and the only force on the pressure plates is that of spring 22. Thus curve 118 follows curve 122 between points C and D.

Between points A and B the clamp load of the pressure plate 18 varies within a limited range of between about 800 Kg and about 1000 Kg so that in a practical clutch which has to cater for tolerance variations and wear of the driven plate the clamp load can be kept within these limits.

FIG. 4 shows the release characteristics of the clutch. Curve 143 represents the release load which arises at the release ring 43 as the release ring is moved to the left from the no load position. Curve 218 represents the lift of the first pressure plate 18 in response to release movement of the release ring 43. During initial deflection up to point E the fingers 28 bend and other flexibility in the system is taken up but the pressure plate does not begin to lift. During this initial release movement and for some further release movement the release load builds up rapidly as the clamp load decreases and the diaphragm spring is held in its released condition by the release load. This is the situation up to point F on the release load curve. From point F to point G the usual declining characteristic of a diaphragm spring is dominant and is modified only slightly by the load variation of the belleville spring 37 (see curve 137 of FIG. 3). At point G, stop 44 engages lug 35 so that the clamp load on driven plate 38 begins to be relieved. The steep characteristic between points G and H corresponds to the gradual relief of this clamp load. Beyond point H the release load is simply the basic release load characteristic of the diaphragm spring 22.

The pressure plate lift characteristic is progressive with increasing release ring movement with only a limited decrease in slope corresponding to the initial lifting of the second pressure plate 34.

The release load characteristic, with its substantially horizontal portion between points F and G and the steep rise between points G and H facilitates clutch operation because the operator can feel by changes in pedal load when the main drive clutch has been released and also when the power take off clutch has been released. The steadily increasing pressure plate lift is also desirable.

Thus the dual clutch as described is not only particularly compact but also exhibits characteristics which are particularly desirable for its operation.

I claim:

1. A dual friction clutch comprising
    a driving member;
    a first driving friction face on the driving member;
    a first driven member having two friction faces, one for engagement with the first driving face;
    a first pressure plate arranged to engage the second friction face of the first driven member;
    a second driving friction face on the driving member;
    a second driven member having two friction faces, one for engagement with the second driving face;
    a second pressure plate arranged to engage the second friction face of the second driven member;
    a cover member secured to the driving member;
    a first plate spring interposed between the cover member and the first pressure plate to urge the first driven member into frictional engagement with the first driving face;
    a second plate spring interposed between the first pressure plate and the second pressure plate to urge the second pressure plate into frictional engagement with the second driving face, the second plate spring exerting a lower force than the first plate spring so as only partially to counteract the force of the first spring on the first pressure plate; and
    release means operatively connected to retract the first pressure plate on initial release movement thereof and for also retracting the second pressure plate on further release movement thereof.

2. A dual friction clutch according to claim 1 wherein the first plate spring is a diaphragm spring having an annular spring portion and integral release levers, the release levers constituting the release means.

3. A dual friction clutch according to claim 1 wherein the second plate spring is a belleville spring.

4. A dual friction clutch according to claim 1 further comprising a stop member on the first pressure plate arranged to engage with a second stop member on the second pressure plate during release of the clutch such that after initial release movement both pressure plates are retracted together.

* * * * *